US005178301A

United States Patent [19]

McGanty

[11] Patent Number: 5,178,301
[45] Date of Patent: Jan. 12, 1993

[54] LOCKING TUBE SQUEEZER

[76] Inventor: Leo F. McGanty, 186 Long Hill Rd., Bolton, Mass. 01740

[21] Appl. No.: 803,571

[22] Filed: Dec. 9, 1991

[51] Int. Cl.⁵ .............................................. B65D 35/32
[52] U.S. Cl. ................................................................ 222/99
[58] Field of Search ................. 222/99, 100, 103, 104; 132/237, 245, 251, 254

[56] References Cited

U.S. PATENT DOCUMENTS

| | | | |
|---|---|---|---|
| 2,862,647 | 12/1958 | Dietz | 222/99 |
| 2,903,162 | 9/1959 | Regan | 222/99 |
| 4,664,293 | 5/1987 | Sheppard | 222/99 |
| 5,014,879 | 5/1991 | Hill | 222/99 |

FOREIGN PATENT DOCUMENTS

| | | | |
|---|---|---|---|
| 115071 | 5/1942 | Australia | 222/99 |
| 0047447 | 3/1982 | European Pat. Off. | 222/99 |
| 130340 | 11/1932 | Sweden | 222/99 |
| 701423 | 12/1953 | United Kingdom | 222/99 |
| 2153329 | 8/1985 | United Kingdom | 222/99 |
| 2174355 | 11/1986 | United Kingdom | 222/99 |

Primary Examiner—Andres Kashnikow
Assistant Examiner—Anthoula Pomrening

[57] ABSTRACT

The locking tube squeezer device is a simple hand held reusable tube squeezer having the appearance of a large key with a slot in which the end of any tube containing a semi-liquid material is inserted. To empty the tube of its contents, the tube is wound about the body of the device and to prevent the tube from unwinding, the device has a slotted handle into which the tube is pushed to lock it in position. The other alternate locking elements are a fork that is positioned around the tube or a folding key handle that folds behind the tube, all accomplishing the intended purpose of locking the tube in place and thus preventing the unwinding of the tube.

1 Claim, 1 Drawing Sheet

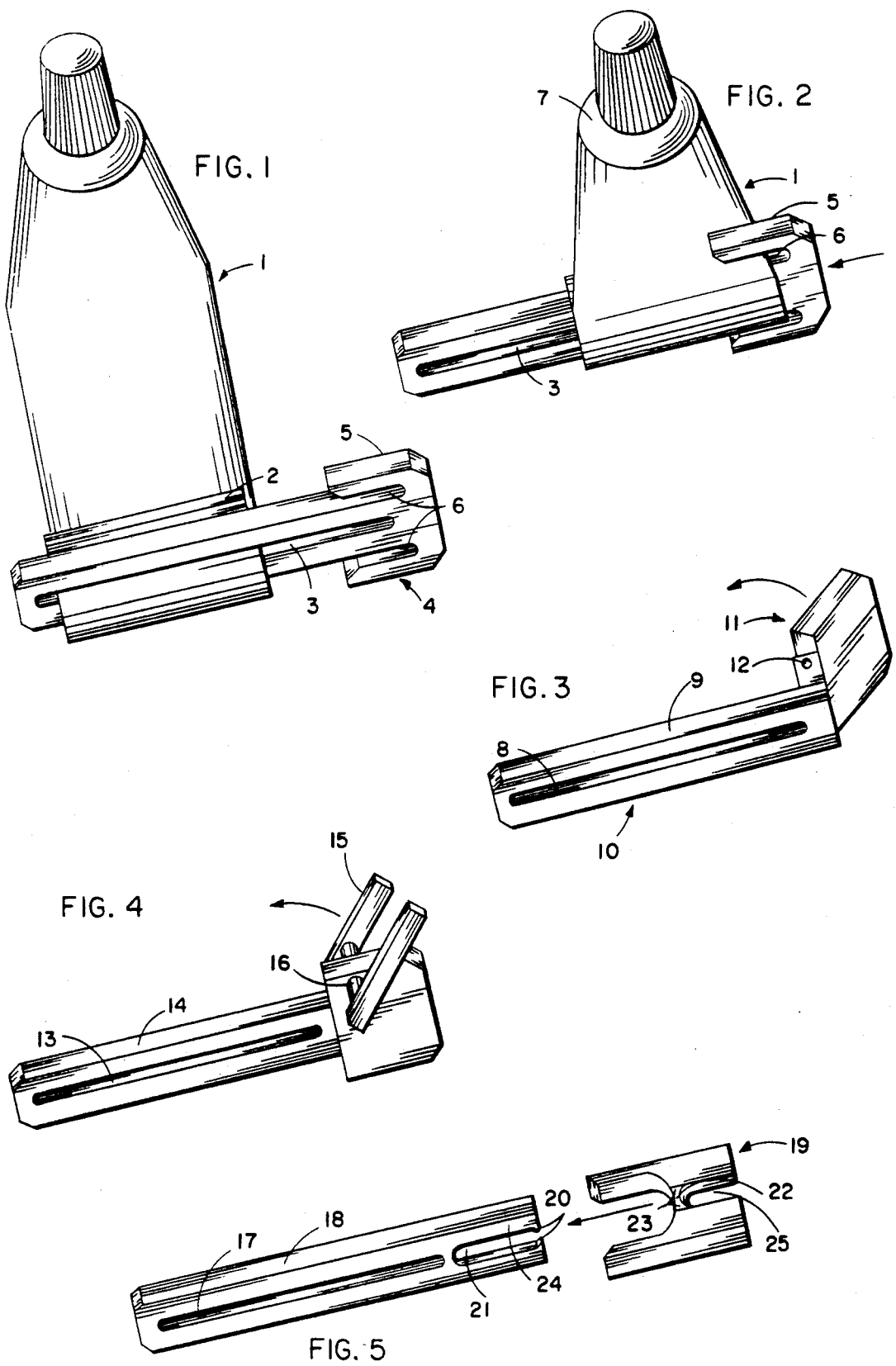

LOCKING TUBE SQUEEZER

BACKGROUND OF THE INVENTION

This invention relates to a device to facilitate dispensing the contents of a metal or plastic collapsible tube thereof.

Heretofore there has been any number of tube squeezing devices, some being held in the hand, others being wall mounted, however, all of these have exhibited qualities that have made them too expensive to manufacture, too mechanically complicated, and most thereof have not had a suitable locking device to prevent the unwanted unwinding of the tube being dispensed. Most of us are familiar with the key-like squeezer that has a slot with which to engage the bottom of a tube. Upon winding the tube to evacuate the contents therein, one finds that upon releasing the handle of the squeezer, the tube has a tendency to unravel. This is especially true when a plastic tube is used. Most flexible plastics have material 'memory traits' that induce them to return to a former position. Over the years there have been many wall mounted dispensers invented as evidenced in the prior art. When one realizes that any one person uses several tubes of products such as toothpaste, shampoo, skin moisturizers, hair preparations, etc., it becomes quite obvious of the impracticality of a single tube squeezer or multiple wall mounted tube squeezers because of the expense of purchasing such units, the wall space occupied, and the installation time.

There is a well defined need for a quick locking, hand held, inexpensive, mechanically simple, single piece, or multiple piece tube squeezer that would save the consuming public and industry much money, time and frustration.

SUMMARY OF THE INVENTION

The present invention may be inexpensively fabricated from plastic or metal or ceramics. This invention is a locking, reusable key-like, single piece or two piece, hand held tube squeezer that is made therein from plastic, metal or ceramics, having a longitudinal slot that engages the bottom end of the tube. The tube is wound about the longitudinal body pushing the remaining contents of the tube to the cap end to a point whereby all of the contents are located in a small area at the cap end of the tube. At this point the tube is pushed along the longitudinal slot to a point wherein another slot in the handle of the tube squeezer engages the back side of the tube therein locking it in place and preventing it from unwinding.

Another variation of the locking device is a two piece tube squeezer having a longitudinal slot similar to the single piece tube squeezer arrangement. After winding the tube to a position whereby the contents are at the cap end therein, the locking device, which in this case is the handle on the tube squeezer, folds behind the back of the tube therein and holds the wound tube in a locked position.

A further variation of the locking device is a two piece tube squeezer having the same longitudinal slot as the other above tube squeezers. After winding the tube to a position whereby the contents are at the cap end, the locking device which is a swinging fork located in the handle of the tube squeezer therewith can be swung into position whereby one lateral member of the fork is behind the wound tube and the other lateral member is in front of the wound tube, thus creating a locked position to prevent unwinding.

The other forked variation is a two piece tube squeezer having the same longitudinal slot as the tube squeezers above. After winding the tube to a position whereby the contents have been squeezed toward the tube cap, again the locking device is a fork such as the above tube squeezer has but in this case the fork, instead of swinging, slides forward to engage the back and front of the tube to accomplish a locked position and thus preventing any unwinding movement.

It goes without saying that this simple, inexpensive, hand held locking tube squeezer would have a wide acceptance in industry where innumerable tubes of expensive cement, adhesive, and various semi-fluid chemicals are used.

BRIEF DESCRIPTION OF THE DRAWINGS

Advantages of this invention will become apparent to persons skilled in the art upon examining the illustrated embodiments in the following drawings.

FIG. 1 is a perspective view showing the unwound tube.

FIG. 2 is a perspective view showing the tube in the wound and locked position.

FIG. 3 shows a tube squeezer with the hinged handle that is the locking device.

FIG. 4 shows a tube squeezer with a swinging fork that is the locking device.

FIG. 5 shows a tube squeezer with a fork that slides forward to act as the locking device.

DESCRIPTION OF THE PREFERRED EMBODIMENT

The locking tube squeezer is shown in its entirety in FIGS. 1 to 5 of the drawings herewith.

FIG. 1 shows tube 1 with the tube bottom 2 inserted in the longitudinal slot 3 therewith the tube squeezer 4. The tube 1 is in the unwound position located in the opposite end of the tube squeezer 4 opposing the locking end handle 5 of the tube squeezer 4, such locking end handle 5 having two lateral slots 6 180° apart that are an integral part therewith of the locking end handle 5. The opposing lateral slots 6 being 180° apart offer a better locking arrangement therein by having either of slots 6 available to engage the back of tube 1 to give the locked position The tube squeezers in FIGS. 1 to 5 could be fabricated simply and inexpensively thereof with the existing plastic technology using any number of plastic materials such as polystyrene, polypropylene, and cellulose acetate. The tube squeezer could also be made from metal or ceramics.

FIG. 2 demonstrates the tube 1 in the wound position with the remaining contents of the tube being pushed t the cap end 7 of the tube 1. The tube 1 in this view has been slid along the longitudinal slot 3 into the locked position therewith the locking end handle 5. One of the lateral slots 6 has engaged the back of the tube 1 to give the locked position. In FIG. 3 the longitudinal slot 8 would engage the tube bottom 2 and the tube 1 would be emptied by winding around the longitudinal body 9. In FIG. 3 the tube squeezer 10 is different than the tube squeezer 4 in FIG. 1 in that the tube 1 is not slid longitudinally along the slot 8 to accomplish a locked position, but is placed in a locked position therein by rotating the tube squeezer handle 11 on the axis 12 in the direction of the arrow to a position behind the back of tube 1, thereby placing tube 1 in a locked condition. FIG. 4 shows a longitudinal slot 13 that would engage the tube bottom 2. The tube 1 would be emptied by winding the tube 1 around the longitudinal body 14. The wound tube 1 is placed in the locked position by rotating the fork 15 on the axis 16, such fork having two lateral members opposite each other and rotating in the direction of the arrow until the two lateral members of the fork 15 ar about parallel to the longitudinal body 14. In this position, the fork 15 would have the tube 1 in the locked position wherein one of the lateral members of the fork 15 would be behind the tube 1 thus preventing it from unwinding. FIG. 5 shows the longitudinal slot 17 that would engage the tube bottom 2. The tube 1 would be emptied by winding the tube 1 around the longitudinal body 18. The wound tube 1 is placed in the locked position by sliding the fork 19 forward and thus locking the tube 1 in place to prevent unwinding. The fork 19 for clarity reasons is shown in FIG. 5 as being disassembled from the longitudinal body 18. In use, a plastic molding of the fork 19 would snap into place at the nibs 20 whereby the fork 19 would become a captured member of the tube squeezer. The fork 19 would ride back and forth in the slot 21 being guided by a molded groove 22 and lateral opposing sides 23 of the groove 22 and also riding against the opposing sides 24. Slot 25 would allow the fork 19 to ride forward and backward; however, the fork 19 would be captured at the nibs 20.

That which is claimed is:

1. A device fabricated from plastic, metal, or ceramics for evacuating the contents of a flexible, collapsible tube, such device having a longitudinal body with a first slot and a second slot therein, said first slot receiving and holding the bottom end of the tube when winding the tube about said body, said second slot being open ended and having molded nibs, such device further comprising a forked element, separate from the slotted longitudinal body, having a mid-portion with diametrically opposed grooves thereon and two sets of parallel fingers, one set extending from either side of the mid-portion, the mid-portion of said forked element being received into said second slot and captured by said molded nibs, the forked element thus being guided by said second slot in the longitudinal body, the second slot mating with the diametrically opposed grooves of the mid-portion, one set of said parallel fingers being disposed on either side of the longitudinal body with a wound up tube portion disposed therebetween, thereby preventing the tube from unwinding.

* * * * *